(12) United States Patent
Pome et al.

(10) Patent No.: US 11,878,806 B2
(45) Date of Patent: Jan. 23, 2024

(54) AIRCRAFT PROPULSION SYSTEM HAVING A LINEAR ELECTRIC MOTOR

(71) Applicant: Airbus Operations SAS, Toulouse (FR)

(72) Inventors: Pascal Pome, Toulouse (FR); Lionel Czapla, Toulouse (FR); Benjamin Thubert, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 66 days.

(21) Appl. No.: 17/734,212

(22) Filed: May 2, 2022

(65) Prior Publication Data

US 2022/0355942 A1 Nov. 10, 2022

(30) Foreign Application Priority Data

May 4, 2021 (FR) ..................................... 2104713

(51) Int. Cl.
*B64D 27/24* (2006.01)
*B64D 41/00* (2006.01)

(52) U.S. Cl.
CPC ........ *B64D 27/24* (2013.01); *B64D 2041/005* (2013.01)

(58) Field of Classification Search
CPC .. B64D 27/24; B64D 2041/005; B64D 33/08; B64D 35/08; B64D 37/30; B64D 37/34; B64D 35/00; H02K 7/075; H02K 7/1876; H02K 9/19; H02K 16/00; H02K 41/02–0358
See application file for complete search history.

(56) References Cited

U.S. PATENT DOCUMENTS

| | | | | |
|---|---|---|---|---|
| 5,038,062 | A * | 8/1991 | Shiraki | H02K 41/02 310/39 |
| 2016/0049848 | A1* | 2/2016 | Hsu | H02P 25/032 310/23 |
| 2017/0129617 | A1* | 5/2017 | Shah | B64D 27/24 |
| 2017/0141648 | A1* | 5/2017 | Chong | H02K 41/02 |
| 2017/0190435 | A1 | 7/2017 | Kobayashi et al. | |
| 2019/0118961 | A1* | 4/2019 | Woodruff | B64C 27/12 |
| 2022/0345017 | A1* | 10/2022 | Ohashi | H02K 7/14 |

FOREIGN PATENT DOCUMENTS

CN 105375677 A 3/2016

OTHER PUBLICATIONS

French Search Report; priority document.

* cited by examiner

*Primary Examiner* — Jason H Duger
(74) *Attorney, Agent, or Firm* — Greer, Burns & Crain, Ltd.

(57) ABSTRACT

A propulsion system for an aircraft, which has a chassis, a propeller able to move in rotation about an axis of rotation, a main gear as one with the propeller, an electric generator, at least one linear electric motor having a fixed element and a slider able to move in translation, for each linear electric motor, a secondary gear meshing with the main gear and mounted to be able to move in rotation about an axis of rotation perpendicular to the axis of rotation, and a rod of which one end is articulated on the corresponding slider and of which the other end is articulated on the corresponding secondary gear at an articulation that is offset with respect to the axis of rotation of the secondary gear.

9 Claims, 4 Drawing Sheets

AIRCRAFT PROPULSION SYSTEM HAVING A LINEAR ELECTRIC MOTOR

CROSS-REFERENCES TO RELATED APPLICATIONS

This application claims the benefit of the French patent application No. 2104713 filed on May 4, 2021, the entire disclosures of which are incorporated herein by way of reference.

FIELD OF THE INVENTION

The present invention relates to a propulsion system for an aircraft, the propulsion system having at least one linear electric motor, and to an aircraft having at least one such propulsion system.

BACKGROUND OF THE INVENTION

In order to move, an aircraft has a propulsion system having a rotary motor and a propeller. The rotary motor generates a rotary movement that is transmitted to the propeller.

It is known to use an electric motor in order to set the propeller in motion, and it is also known to use a fuel cell in order to power the rotary electric motor.

Although such an arrangement gives good results, it is desirable to find a different arrangement that makes it possible, inter alia, to obtain a more precise gear ratio.

SUMMARY OF THE INVENTION

An aim of the present invention is to propose a propulsion system having at least one linear electric motor with a particular transmission system that makes it possible, inter alia, to obtain a more precise gear ratio.

To that end, there is proposed a propulsion system for an aircraft, having:
  a chassis,
  a propeller mounted so as to be able to move in rotation on the chassis about an axis of rotation,
  a main gear as one with the propeller and coaxial with the axis of rotation,
  an electric generator,
  at least one linear electric motor electrically powered by the electric generator and having a fixed element that is fastened to the chassis and a slider that is able to move in translation along the fixed element in a direction of movement,
  for each linear electric motor, a secondary gear meshing with the main gear and mounted so as to be able to move in rotation on the chassis about an axis of rotation perpendicular to the axis of rotation, and
  for each linear electric motor, a rod with two ends, of which one is mounted articulated at an articulation on the slider of the corresponding linear electric motor, and of which the other is mounted articulated on the corresponding secondary gear at an articulation that is offset with respect to the axis of rotation of the secondary gear associated with the linear electric motor.

With such a transmission system, it is possible to use linear electric motors and a gear train having a precise gear ratio.

Advantageously, the direction of movement is parallel to the axis of rotation of the propeller.

Advantageously, each slider moves between two extreme positions, namely a proximal position as close as possible to the secondary gear and a distal position as far as possible from the secondary gear, when the slider is in the proximal position, the axes of the two articulations and the axis of rotation of the secondary gear are aligned with each other and the axis of rotation of the secondary gear is between the axes of the two articulations and when the slider is in the distal position, the axes of the two articulations and the axis of rotation of the secondary gear are aligned with each other and the axis of the articulation of the secondary gear is between the axis of the articulation of the slider and the axis of rotation of the secondary gear.

The invention also proposes an aircraft having at least one propulsion system according to one of the preceding variants.

Advantageously, the electric generator is a fuel cell, and the aircraft has a dihydrogen reservoir, a conveying duct that conveys the dihydrogen from the reservoir to the fuel cell and a cooling system arranged to cool each linear electric motor.

According to a particular embodiment, the cooling system has the reservoir and, for each linear electric motor, a conveying duct that is arranged to ensure an exchange of heat between the linear electric motor and the dihydrogen circulating in the conveying duct between the reservoir and the fuel cell.

According to a particular embodiment, the cooling system has the reservoir and the conveying duct that is arranged to ensure an exchange of heat successively between each linear electric motor and the dihydrogen circulating in the conveying duct between the reservoir and the fuel cell.

Advantageously, the cooling system also has a heat exchanger that is arranged downstream of the linear electric motors to ensure an exchange of heat between the dihydrogen circulating in the conveying duct and a fluid.

According to a particular embodiment, the cooling system has a first heat exchanger, a second heat exchanger, an exchange duct in which a heat-transfer fluid circulates, the reservoir and the conveying duct, the exchange duct forms a loop that is arranged to successively pass through the first heat exchanger, ensure an exchange of heat successively between each linear electric motor and the heat-transfer fluid, pass through the second heat exchanger and re-join the first heat exchanger, the first heat exchanger is arranged to ensure an exchange of heat between the dihydrogen circulating in the conveying duct between the reservoir and the fuel cell and the heat-transfer fluid circulating in the exchange duct, the second heat exchanger is arranged to ensure an exchange of heat between the heat-transfer fluid circulating in the exchange duct and a fluid, and the first heat exchanger is disposed upstream of the linear electric motors and the second heat exchanger is disposed downstream of the linear electric motors with respect to the direction of flow of the heat-transfer fluid in the exchange duct.

BRIEF DESCRIPTION OF THE DRAWINGS

The abovementioned features of the invention, along with others, will become more clearly apparent upon reading the following description of one exemplary embodiment, the description being given with reference to the appended drawings, in which.

DETAILED DESCRIPTION OF THE PREFERRED EMBODIMENTS

Figure 1:
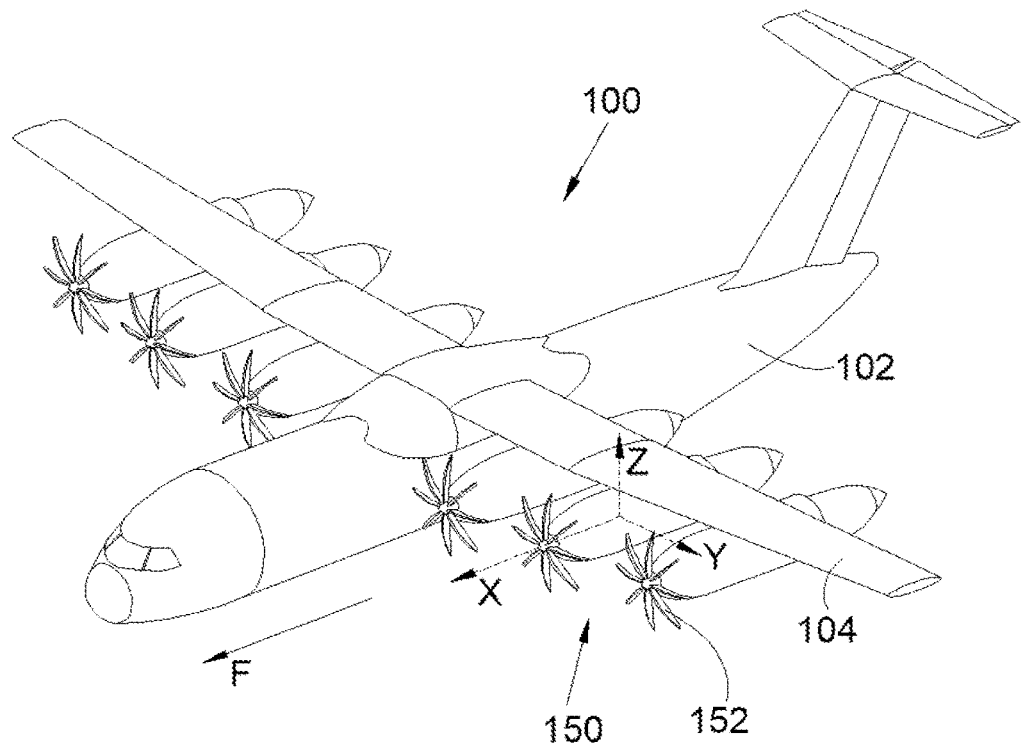
FIG. 1 is a perspective view of an aircraft having a plurality of propeller propulsion systems according to the invention.

In the following description, terms relating to a position are considered in relation to an aircraft in a position of forward movement, i.e., as shown in FIG. 1 in which the arrow F shows the direction of forward movement of the aircraft.

FIG. 1 shows an aircraft 100 that has a fuselage 102, on either side of which is fastened a wing 104. At least one propeller propulsion system 150 is fastened under each wing 104. In the embodiment of the invention that is presented in FIG. 1, there are three propulsion systems 150 per wing 104.

Figure 2:
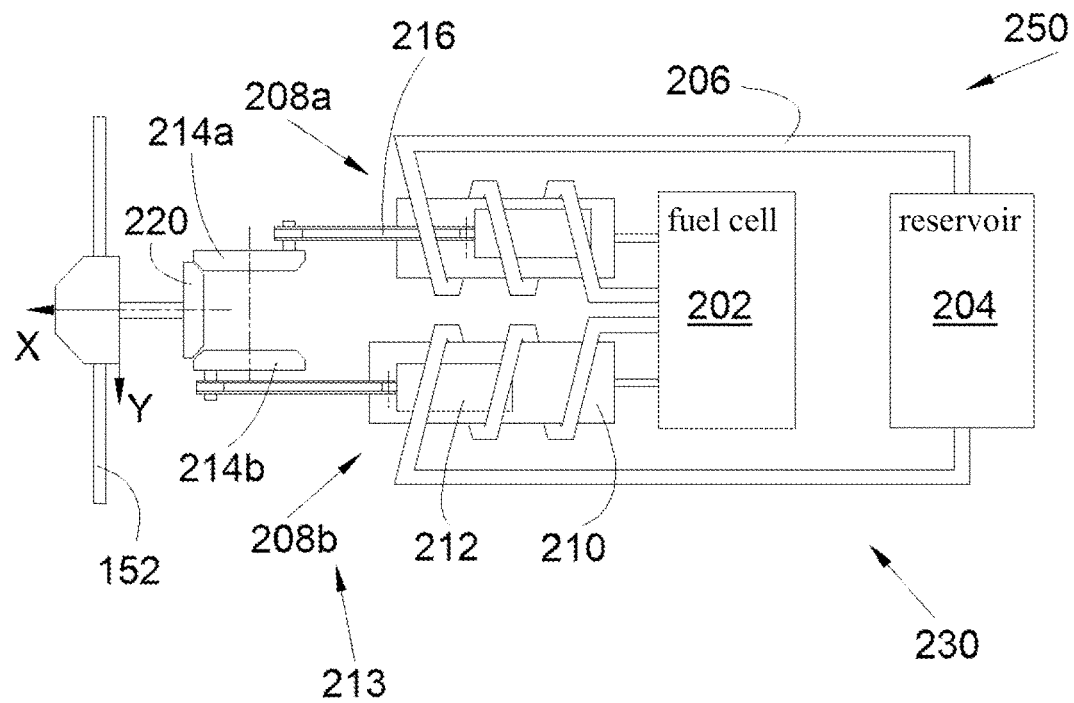
FIG. 2 is a schematic depiction of a propeller propulsion system according to a first embodiment of the invention.
Figure 3:
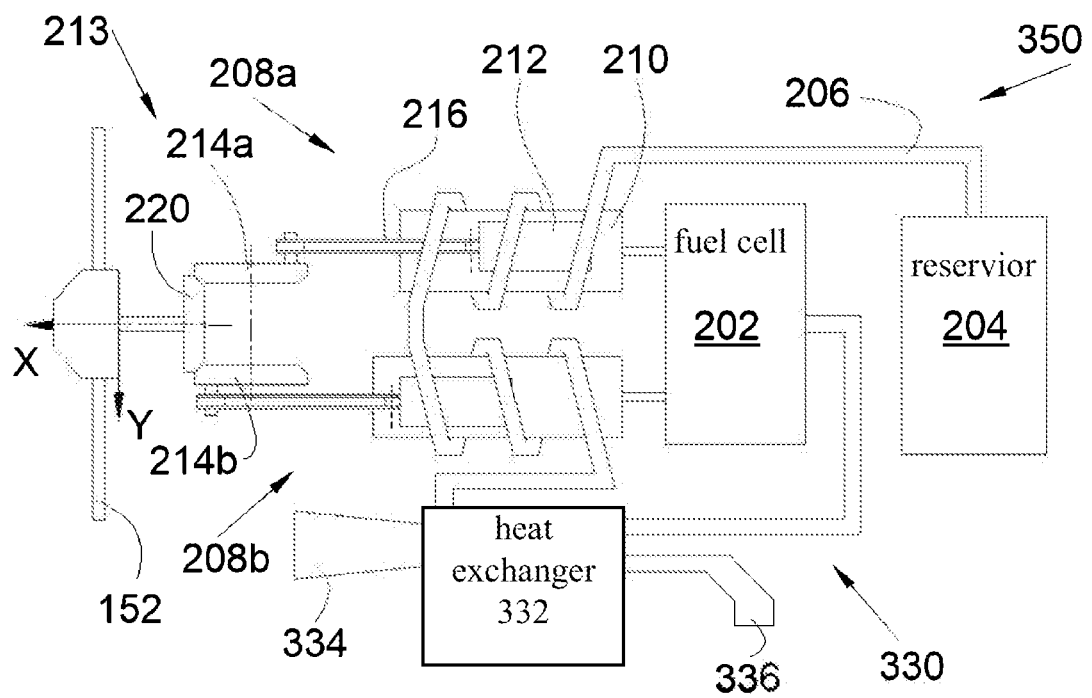
FIG. 3 is a schematic depiction of a propeller propulsion system according to a second embodiment of the invention.
Figure 4:
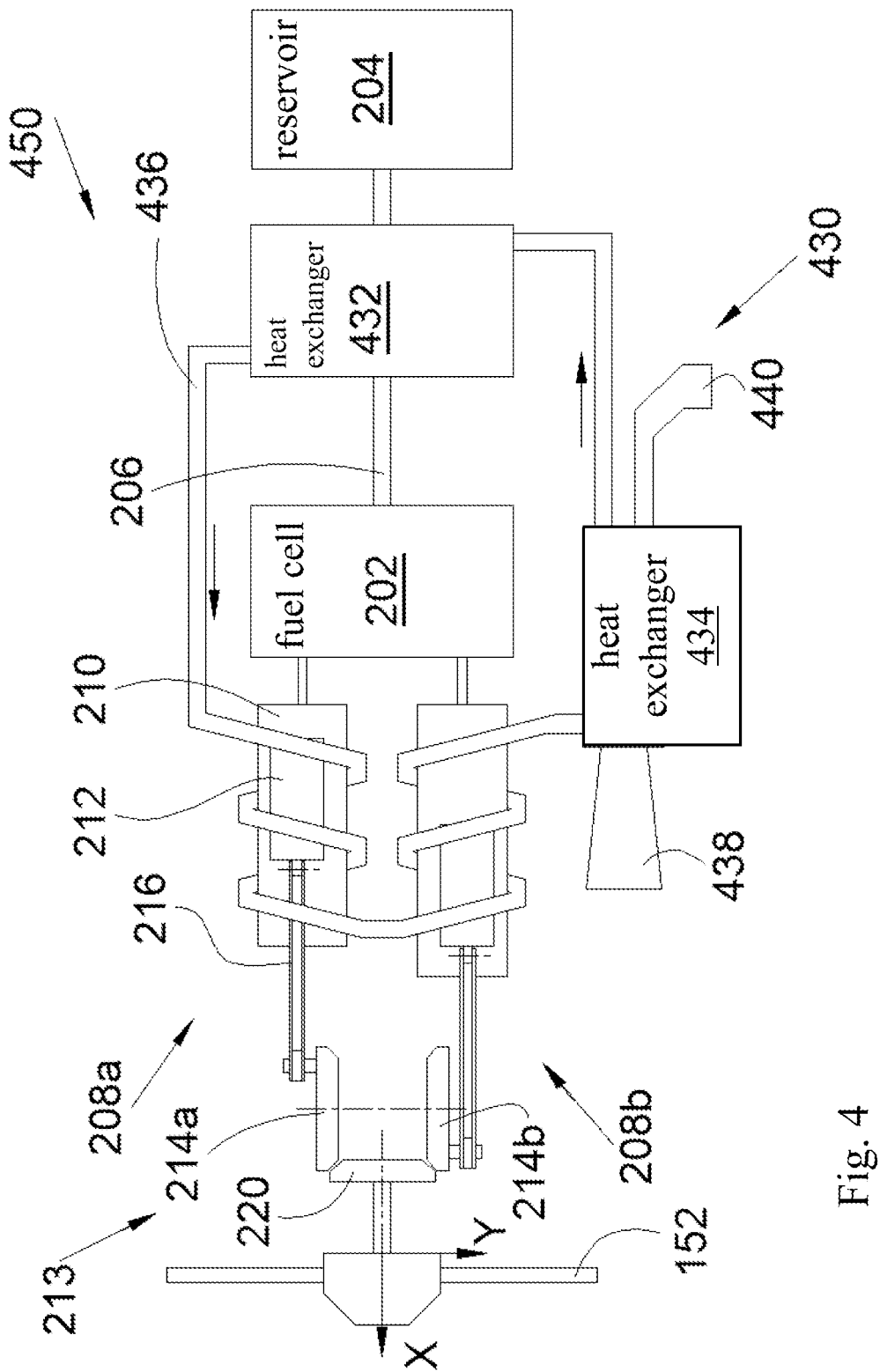
FIG. 4 is a schematic depiction of a propeller propulsion system according to a third embodiment of the invention.

FIG. 2 shows the propulsion system 250 according to a first embodiment of the invention, FIG. 3 shows the propulsion system 350 according to a second embodiment of the invention and FIG. 4 shows the propulsion system 450 according to a third embodiment of the invention. The propulsion system 250, 350, 450 has a chassis and a propeller 152 mounted so as to be able to move in rotation on the chassis.

In the following description, and by convention, X denotes the longitudinal axis, which corresponds to the axis of rotation of the propeller 152 with positive orientation in the direction of forward movement of the aircraft 100, Y denotes the transverse axis, which is horizontal when the aircraft is on the ground, and Z denotes the vertical axis or vertical height when the aircraft is on the ground, these three axes X, Y and Z being mutually orthogonal.

The propulsion system 250, 350, 450 has an electric generator that, in this case, takes the form of a fuel cell 202. The fuel cell 202 is a cell in which an electric voltage is generated by virtue of the oxidation of a reducing fuel, such as, for example, dihydrogen, on one electrode, combined with the reduction of an oxidant, such as for example oxygen from the air, on the other electrode.

In the case of dihydrogen, the aircraft 100 has a reservoir 204 for storing dihydrogen and a conveying duct 206 that conveys the dihydrogen from the reservoir 204 to the fuel cell 202.

In the case of oxygen from the air, the aircraft 100 has an air drawing system, for example scoops that make it possible to draw air for example from outside the aircraft 100 and a supply duct that conveys the air from the air drawing system to the fuel cell 202.

The propulsion system 250, 350, 450 also has at least one linear electric motor 208a-b, wherein each linear electric motor 208a-b is electrically powered by the electric generator, and more particularly in this case by the fuel cell 202 through electrical conductors.

In the embodiment of the invention that is presented in FIGS. 2 to 4, there are two linear electric motors, but there could be only one, or even more than two if the space requirement allows this.

Each linear electric motor 208a-b has a fixed element 210 that is fastened to the chassis and a slider 212 that is able to move in translation along the fixed element 210. The fixed element 210 and the slider 212 have the elements necessary to ensure the movement of the slider 212 along the fixed element 210 in a direction of movement that is in this case parallel to the axis of rotation X and alternately in both opposite directions along the direction of movement.

Each linear electric motor 208a-b is, for example, synchronous and the necessary elements are known to those skilled in the art and have, for example, permanent magnets disposed along the fixed element 210 with south-north alternation, and coils mounted on the slider 212 and supplied with alternating current and phase-shifted appropriately. It is also possible to provide a succession of electromagnets disposed along the fixed element 210 and supplied with alternating current, and permanent magnets mounted on the slider 212.

The propulsion system 250, 350 also has a control unit that controls each linear electric motor 208a-b. In the case of two linear electric motors 208a-b, the control unit can be provided such that when it controls one of the sliders 212 in one of the directions of movement, it simultaneously controls the other of the sliders 212 in the opposite direction and thus the two sliders 212 always move in two opposite directions.

For each linear motor 208a-b, the propulsion system 250, 350, 450 has a transmission system 213 of the rod-crank system type.

Each transmission system 213 has a secondary gear 214a-b mounted so as to be able to move in rotation on the chassis about an axis of rotation perpendicular to the axis of rotation X of the propeller 152 and also, in this case, perpendicular to the direction of movement and in the embodiment of the invention that is presented here, the axis of rotation of each secondary gear 214a-b is parallel to the transverse axis Y.

Figure 5:
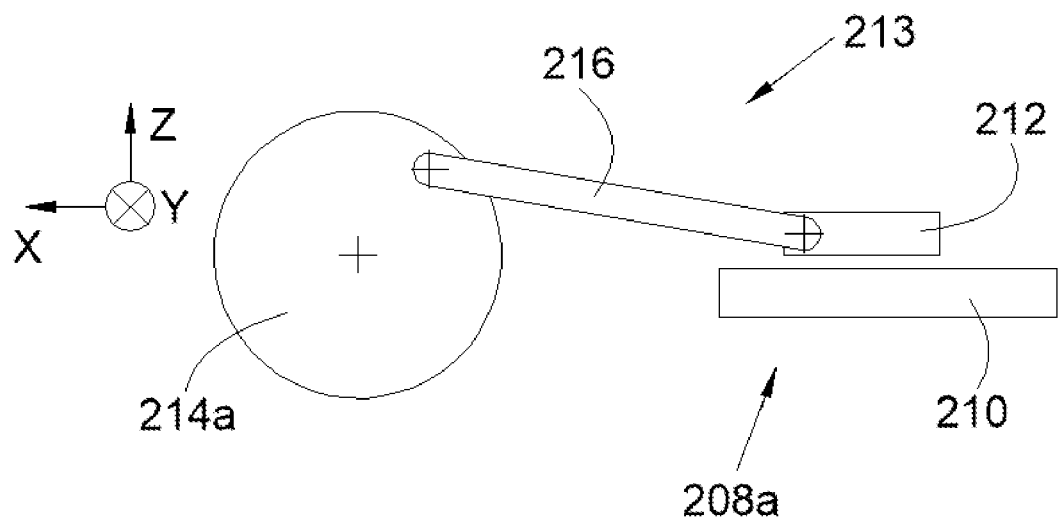
FIG. 5 is a schematic depiction of a propeller propulsion system.

As can be better seen in FIG. 5, which is a side view, each transmission system 213 also has a rod 216 that has two ends, of which one is mounted articulated at an articulation on the slider 212 of the corresponding linear electric motor 208a-b, and of which the other is mounted articulated on the corresponding secondary gear 214a-b at an articulation that is offset with respect to the axis of rotation of the secondary gear 214a-b associated with the linear electric motor 208a-b. Each articulation takes the form of a pivot connection with an axis parallel to the axis of rotation of the secondary gear 214a-b.

Thus, the movement of a slider 212 will drive the rotational movement of the corresponding secondary gear 214a-b under the action of the rod 216.

Each slider 212 moves between two extreme positions, namely a proximal position as close as possible to the secondary gear 214a-b and a distal position as far as possible from the secondary gear 214a-b.

In order to ensure that the secondary gear 214a-b always rotates in the same direction regardless of the direction of movement of the slider 212, it is necessary that when the slider 212 is in the proximal position, the axes of the two articulations and the axis of rotation of the secondary gear 214a-b are aligned with each other and the axis of rotation of the secondary gear 214a-b is between the axes of the two articulations and that when the slider 212 is in the distal position, the axes of the two articulations and the axis of rotation of the secondary gear 214a-b are aligned with each other and the axis of the articulation of the secondary gear 214a-b is between the axis of the articulation of the slider 212 and the axis of rotation of the secondary gear 214a-b.

The propulsion system 250, 350, 450 also has a main gear 220 that is mounted so as to be able to move in rotation on the chassis about the axis of rotation X of the propeller 152 and is as one with the propeller 152. The main gear 220 is coaxial with the axis of rotation X of the propeller 152.

The main gear 220 meshes with each of the secondary gears 214*a-b*, and in the embodiment of the invention that is presented in FIGS. 2 to 4, each gear 220, 214*a-b* takes the form of a bevel gear.

In operation, for each linear electric motor 208*a-b*, the slider 212 is set in motion, and this drives the setting in rotation of the corresponding secondary gear 214*a-b* that then rotates continuously and, in turn, drives the main gear 220 and consequently the propeller 152. Such an arrangement makes it possible, inter alia, to obtain a precise gear ratio.

In the embodiments of the invention that are presented here, there are two linear electric motors 208*a-b* that are disposed such that their secondary gears 214*a-b* are disposed diametrically opposite one another with respect to the main gear 220. In the case of a greater number of linear electric motors, the linear electric motors 208*a-b* will be distributed such that their secondary gears 214*a-b* are distributed regularly about the axis of rotation X of the propeller 152.

Each linear electric motor 208*a-b* tends to heat up during operation and, in particular in the case of a superconducting motor, it is desirable to cool the linear electric motor 208*a-b* in order to ensure optimal performance thereof. To this end, the propulsion system 250, 350, 450 has a cooling system 230, 330, 430.

In the embodiment in FIG. 2, the cooling system 230 has the dihydrogen reservoir 204 and, for each linear electric motor 208*a-b*, a conveying duct 206 that is arranged to ensure an exchange of heat between the linear electric motor 208*a-b* and the dihydrogen, which is, in particular, in liquid form, circulating in the conveying duct 206 between the reservoir 204 and the fuel cell 202. In the embodiment of the invention that is presented here, the arrangement is embodied by a winding of the conveying duct 206 around the linear electric motor 208*a-b*, but in another embodiment the arrangement could be constituted of channels formed inside the linear electric motor 208*a-b* that target, for example, specific zones of the linear electric motor 208*a-b*.

After the exchange of heat with the linear electric motor 208*a-b*, the conveying duct 206 extends as far as the fuel cell 202.

In the embodiment in FIG. 2, there is, therefore, one conveying duct 206 per linear electric motor 208*a-b*.

In the embodiment in FIG. 3, the cooling system 330 has the dihydrogen reservoir 204 and a conveying duct 206 that is arranged to ensure an exchange of heat successively between each linear electric motor 208*a-b* and the dihydrogen, which is, in particular, in liquid form, circulating in the conveying duct 206 between the reservoir 204 and the fuel cell 202. In the embodiment of the invention that is presented here, the arrangement is embodied by a winding of the conveying duct 206 around each linear electric motor 208*a-b*.

After the exchange of heat with all the linear electric motors 208*a-b*, the conveying duct 206 extends as far as the fuel cell 202.

In the embodiment in FIG. 3, there is therefore one conveying duct 206 for all of the linear electric motors 208*a-b*.

In the embodiment in FIG. 3, the cooling system 330 also has a heat exchanger 332 that exchanges heat between the dihydrogen circulating in the conveying duct 206 and a fluid. The fluid is for example air, such as, for example, outside air drawn for example from the outside at a scoop 334 and rejected, for example, to the outside through a discharge opening 336. The fluid can also be air coming from the nacelle, oil, air leaving the fuel cell 202. The heat exchanger 332 is disposed downstream of the linear electric motors 208*a-b* with respect to the direction of flow of the dihydrogen in the conveying duct 206.

In the embodiment in FIG. 4, the cooling system 430 has a first heat exchanger 432, a second heat exchanger 434 and an exchange duct 436 in which a heat-transfer fluid such as for example liquid methane circulates.

The exchange duct 436 forms a loop that is arranged to successively pass through the first heat exchanger 432, ensure an exchange of heat successively between each linear electric motor 208*a-b* and the heat-transfer fluid, pass through the second heat exchanger 434 and re-join the first heat exchanger 432.

The heat-transfer fluid thus circulates from the first heat exchanger 432, to the linear electric motors 208*a-b*, then to the second heat exchanger 434 and loops as far as the first heat exchanger 432. The heat-transfer fluid is set in motion by any appropriate drive means such as for example a pump installed on the exchange duct 436.

The cooling system 430 also has the reservoir 204 and the conveying duct 206 that passes through the first heat exchanger 432 that is thus arranged to ensure an exchange of heat between the dihydrogen circulating in the conveying duct 206 between the reservoir 204 and the fuel cell 202 and the heat-transfer fluid circulating in the exchange duct 436. After this exchange of heat, the conveying duct 206 extends as far as the fuel cell 202.

The second heat exchanger 434 is arranged to ensure an exchange of heat between the heat-transfer fluid circulating in the exchange duct 436 and a fluid such as fresh air drawn for example from the outside at a scoop 438 and rejected, for example, to the outside through a discharge opening 440 or any other fluid as explained above for the heat exchanger 332 in FIG. 3.

The first heat exchanger 432 is disposed upstream of the linear electric motors 208*a-b* and the second heat exchanger 434 is disposed downstream of the linear electric motors 208*a-b* with respect to the direction of flow of the heat-transfer fluid in the exchange duct 436.

In the embodiments of the invention that are described here, in particular in the case of superconducting motors, of which the temperature for optimal operation is of the order of 77° K, the use of liquid dihydrogen of which the temperature is between 20° K and 30° K ensures good cooling of the superconducting motors. Furthermore, the use of the heat exchanger 332 makes it possible to heat the dihydrogen up to its gas phase before it is introduced into the fuel cell 202.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsion system for an aircraft, comprising:
a chassis,
a propeller mounted to be able to move in rotation on the chassis about an axis of rotation,
a main gear as one with the propeller and coaxial with the axis of rotation,
an electric generator,
at least one linear electric motor electrically powered by the electric generator and having a fixed element fastened to the chassis and a slider configured to move in translation along the fixed element in a direction of movement,
for each linear electric motor, a secondary gear meshing with the main gear and mounted to be able to move in rotation on the chassis about an axis of rotation perpendicular to the propeller axis of rotation, and
for each linear electric motor, a rod with a first end and a second end, of which the first end is mounted articulated at a first articulation on the slider of the corresponding linear electric motor, and of which the second end is mounted articulated at a second articulation on the corresponding secondary gear at an articulation offset with respect to the axis of rotation of the secondary gear associated with the linear electric motor.

2. The propulsion system according to claim 1, wherein the direction of movement is parallel to the axis of rotation of the propeller.

3. The propulsion system according to claim 1,
wherein each slider moves between two extreme positions, namely a proximal position as close as possible to the secondary gear and a distal position as far as possible from the secondary gear,
wherein when the slider is in the proximal position, axes of the first and second articulations and the axis of rotation of the secondary gear are aligned with each other and the axis of rotation of the secondary gear is between the axes of the first and second articulations, and
wherein when the slider is in the distal position, the axes of the first and second articulations and the axis of rotation of the secondary gear are aligned with each other and the axis of the second articulation is between the axis of the first articulation and the axis of rotation of the secondary gear.

4. An aircraft having at least one propulsion system according to claim 1.

5. The aircraft according to claim 4,
wherein the electric generator is a fuel cell, and
wherein the aircraft has a reservoir for dihydrogen, a conveying duct that conveys dihydrogen from the reservoir to the fuel cell and a cooling system arranged to cool each linear electric motor.

6. The aircraft according to claim 5, wherein the cooling system has the reservoir and, for each linear electric motor, the conveying duct is arranged to ensure an exchange of heat between the linear electric motor and the dihydrogen circulating in the conveying duct between the reservoir and the fuel cell.

7. The aircraft according to claim 5, wherein the cooling system has the reservoir and the conveying duct arranged to ensure an exchange of heat successively between linear electric motors of the at least one linear electric motor and the dihydrogen circulating in the conveying duct between the reservoir and the fuel cell.

8. The aircraft according to claim 7, wherein the cooling system also has a heat exchanger arranged downstream of the linear electric motors to ensure an exchange of heat between the dihydrogen circulating in the conveying duct and a fluid.

9. The aircraft according to claim 7,
wherein the cooling system has a first heat exchanger, a second heat exchanger, an exchange duct in which a heat-transfer fluid circulates, the reservoir and the conveying duct,
wherein the exchange duct forms a loop that is arranged to:
successively pass through the first heat exchanger,
ensure an exchange of heat successively between each linear electric motor and the heat-transfer fluid,
pass through the second heat exchanger and re-join the first heat exchanger,
wherein the first heat exchanger is arranged to ensure an exchange of heat between the dihydrogen circulating in the conveying duct between the reservoir and the fuel cell and the heat-transfer fluid circulating in the exchange duct,
wherein the second heat exchanger is arranged to ensure an exchange of heat between the heat-transfer fluid circulating in the exchange duct and an additional fluid, and
wherein the first heat exchanger is disposed upstream of the linear electric motors and the second heat exchanger is disposed downstream of the linear electric motors with respect to a direction of flow of the heat-transfer fluid in the exchange duct.

* * * * *